United States Patent
Park et al.

(10) Patent No.: US 8,897,238 B2
(45) Date of Patent: Nov. 25, 2014

(54) APPARATUS AND METHOD OF REPORTING AMOUNT OF INFORMATION IN WIRELESS COMMUNICATION SYSTEM

(75) Inventors: Sung Jun Park, Anyang-si (KR); Sung Duck Chun, Anyang-si (KR); Sung Hoon Jung, Anyang-si (KR); Seung June Yi, Anyang-si (KR); Young Dae Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 13/100,199

(22) Filed: May 3, 2011

(65) Prior Publication Data

US 2011/0274044 A1    Nov. 10, 2011

Related U.S. Application Data

(60) Provisional application No. 61/330,888, filed on May 4, 2010.

(51) Int. Cl.
*H04W 72/12* (2009.01)
*H04L 12/801* (2013.01)

(52) U.S. Cl.
CPC ...... *H04W 72/1284* (2013.01); *H04W 72/1221* (2013.01); *H04L 47/10* (2013.01)
USPC .......................................... 370/329; 370/338

(58) Field of Classification Search
CPC ............... H04W 72/0413; H04W 72/0486; H04W 72/1252; H04W 72/1284
USPC .............. 370/328–338, 412–418, 468
See application file for complete search history.

(56) References Cited

U.S. PATENT DOCUMENTS

2011/0085566 A1* 4/2011 Bucknell et al. .............. 370/412

OTHER PUBLICATIONS

3GPP TS 36.321 V8.10: 3rd Generation Partnership Project; Technical Specification Group Radio Access Network; Evolved Universal Terrestrial Radio Access (E-UTRA) Medium Access Control (MAC) Protocol Specification (Release 8); pp. 22-24; Year: 2008.*

* cited by examiner

*Primary Examiner* — Pao Sinkantarakorn
(74) *Attorney, Agent, or Firm* — Lee, Hong, Degerman, Kang & Waimey

(57) ABSTRACT

A method and apparatus of reporting an amount of information in a wireless communication system is provided. A user equipment reports a first part indicating that an amount of information is larger than a specific value, and reports a second part indicating the amount of the information.

12 Claims, 13 Drawing Sheets

FIG. 5
(PRIOR ART)
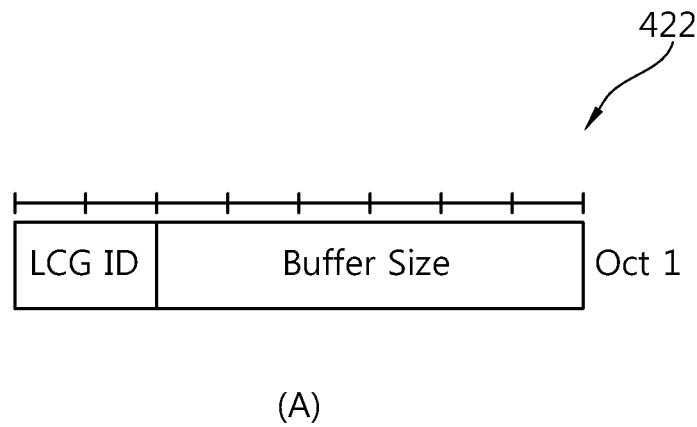
(A)
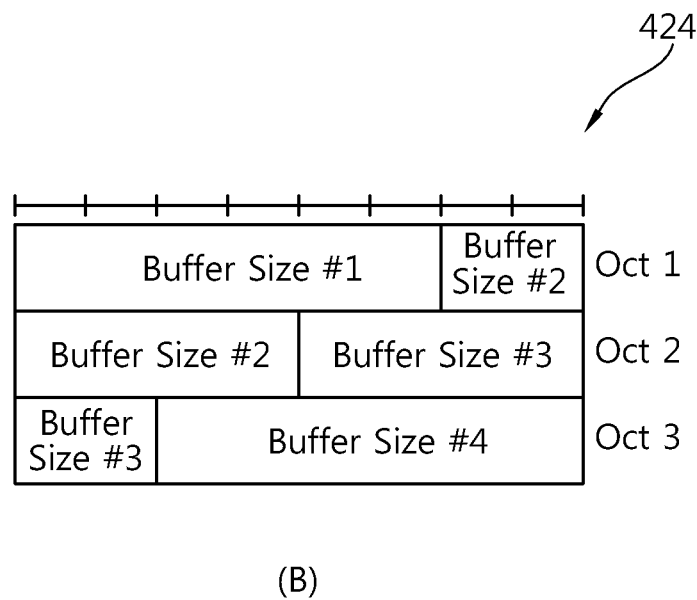
(B)

APPARATUS AND METHOD OF REPORTING AMOUNT OF INFORMATION IN WIRELESS COMMUNICATION SYSTEM

CROSS-REFERENCE TO RELATED APPLICATIONS

Pursuant to 35 U.S.C. §119(e), this application claims the benefit of U.S. Provisional Patent Application Ser. No. 61/330,888 filed on May 4, 2010, the contents of which is hereby incorporated by reference herein in its entirety.

BACKGROUND OF THE INVENTION

1. Field of the Invention

The present invention relates to wireless communications, and more particularly, to a method and apparatus for reporting an amount of information in a wireless communication system.

2. Related Art $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The 3GPP LTE-A employs various techniques such as carrier aggregation, relay, etc. The 3GPP LTE system is a single carrier system supporting only one bandwidth (i.e., one component carrier) among {1.4, 3, 5, 10, 15, 20} MHz. On the other hand, the LTE-A employs multiple carriers using carrier aggregation. The component carrier is defined with a center frequency and a bandwidth. The component carrier may correspond to one cell. A multiple carrier system uses a plurality of component carriers having a narrower bandwidth than a full bandwidth.

A buffer status report (BSR) is used to provide a serving cell with information about the amount of data available for transmission in the uplink buffers of a user equipment.

As employing new techniques such as uplink multiple input multiple output (MIMO) or carrier aggregation, a buffer size to be reported by using BSR increases.

SUMMARY OF THE INVENTION

The present invention provides a method and apparatus for reporting an amount of information in a wireless communication system.

In an aspect, a method of reporting an amount of information in a wireless communication system is provided. The method includes reporting, by a user equipment, a first part indicating that an amount of information is larger than a specific value, and reporting, by the user equipment, a second part indicating the amount of the information.

The information may be a buffer size of the user equipment.

The first part and the second part may be included in a medium access control (MAC) protocol data unit (PDU).

The MAC PDU may include a MAC header, a MAC control element (CE) and the second part.

The MAC CE may include the first part and a logical channel group identifier which identifies a group of at least one logical channel which buffer status is being reported.

In another aspect, an apparatus of reporting an amount of information in a wireless communication system is provided. The apparatus includes a radio frequency unit for receiving and transmitting radio signals, a processor operatively coupled with the radio frequency unit and configured for reporting a first part indicating that an amount of information is larger than a specific value, and reporting a second part indicating the amount of the information.

BRIEF DESCRIPTION OF THE DRAWINGS

FIG. 5 shows structures of MAC CEs used for BSR.

DESCRIPTION OF EXEMPLARY EMBODIMENTS

Figure 1:
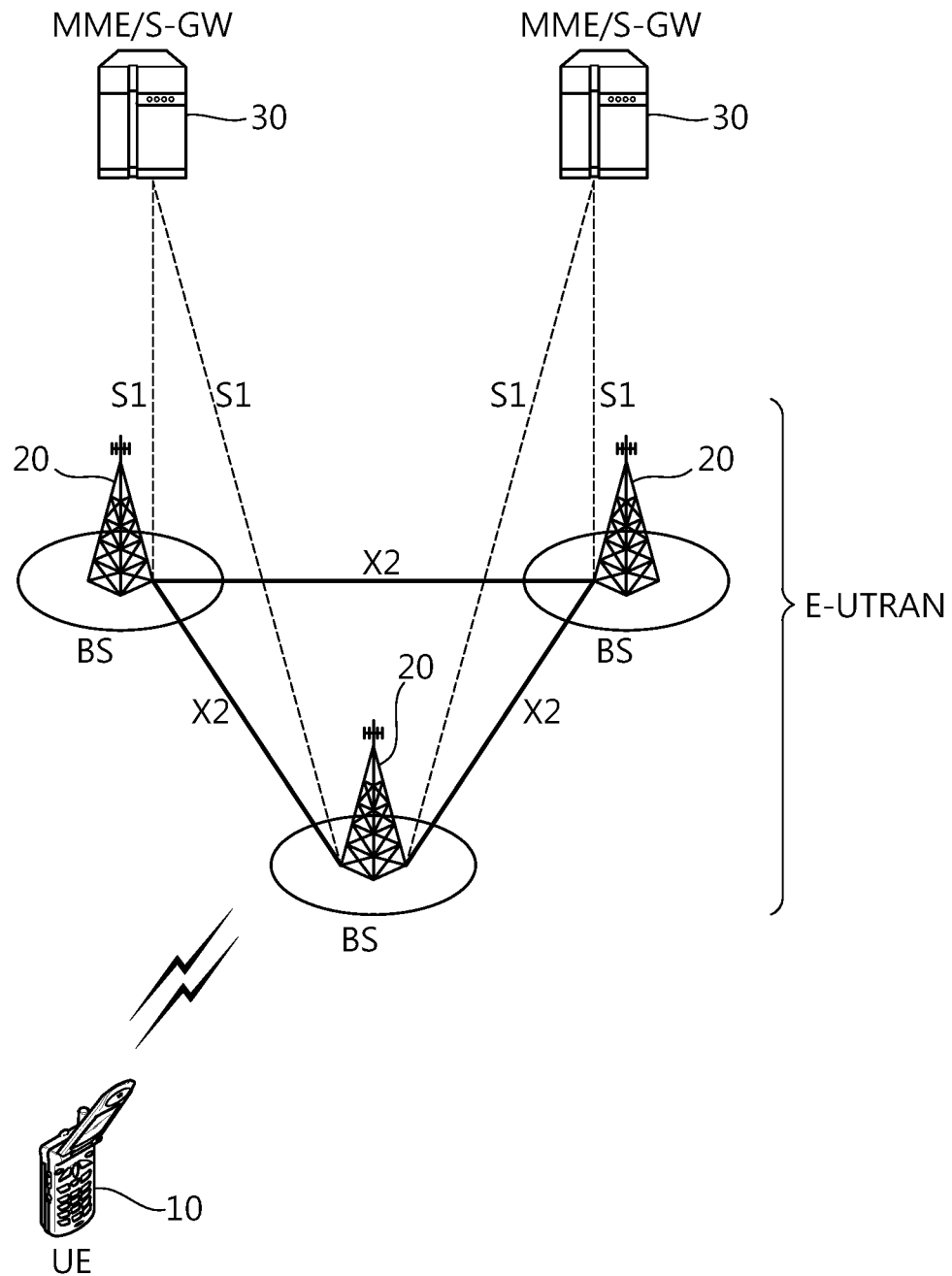
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
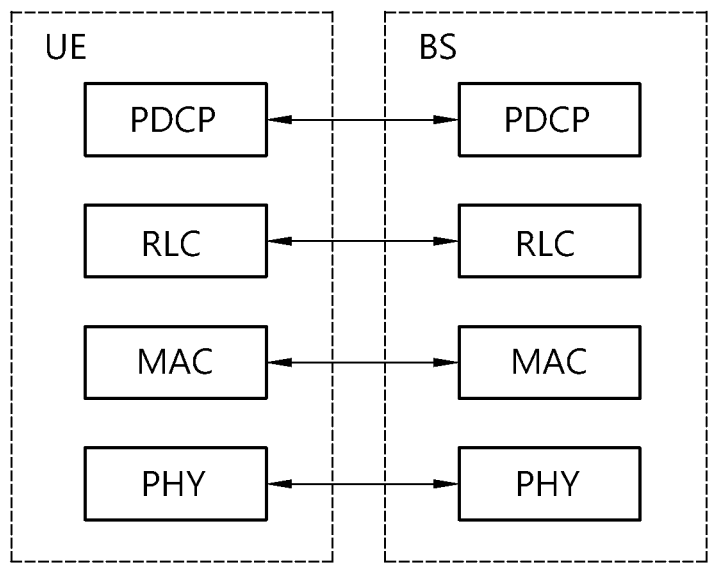
FIG. 2 is a diagram illustrating a radio protocol architecture for a user plane.
Figure 3:
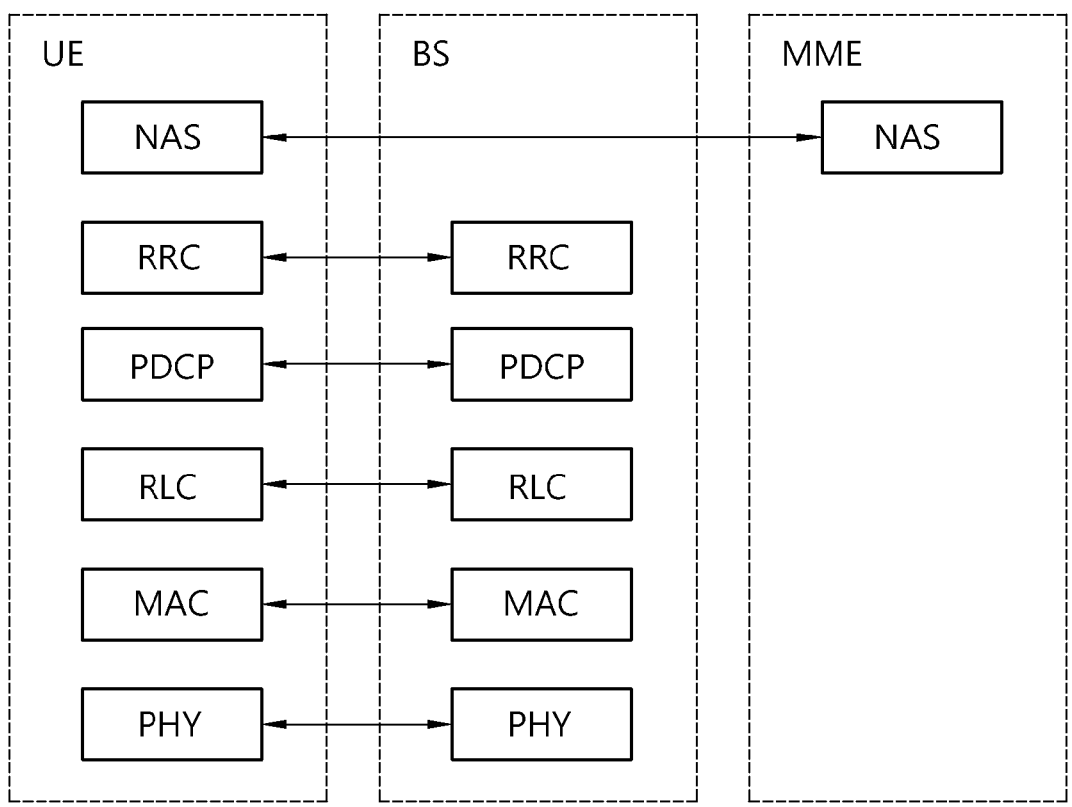
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Now, a buffer status reporting will be described.

The buffer status report (BSR) is used to provide a serving cell with information about the amount of data available for transmission in the uplink buffers of the UE.

For the BSR procedure, the UE considers all radio bearers which are not suspended and may consider radio bearers which are suspended.

The BSR is triggered if any predefined event occurs. According to its event, the BSR can be classified as three types: regular BSR, padding BSR and periodic BSR.

A regular BSR may be triggered if uplink data, for a logical channel which belongs to a logical channel group (LCG), becomes available for transmission in the RLC entity or in the PDCP entity. The definition of what data are considered as available for transmission is specified in section 4.5 of 3GPP TS 36.322 V9.1.0 (2010-03) and section 4.5 of 3GPP TS 36.323 V9.0.0 (2009-12), respectively. The regular BSR may be triggered if the data belongs to a logical channel with higher priority than the priorities of the logical channels which belong to any LCG and for which data is already available for transmission. The regular BSR may also be triggered if there is no data available for transmission for any of the logical channels which belong to a LCG.

A padding BSR may be triggered if uplink resources are allocated and number of padding bits is equal to or larger than the size of the BSR MAC control element (CE) plus its subheader.

A regular BSR may be triggered if a retransmission BSR timer expires and the UE has data available for transmission for any of the logical channels which belong to a LCG.

A periodic BSR may be triggered if a periodic BSR timer expires.

Figure 4:
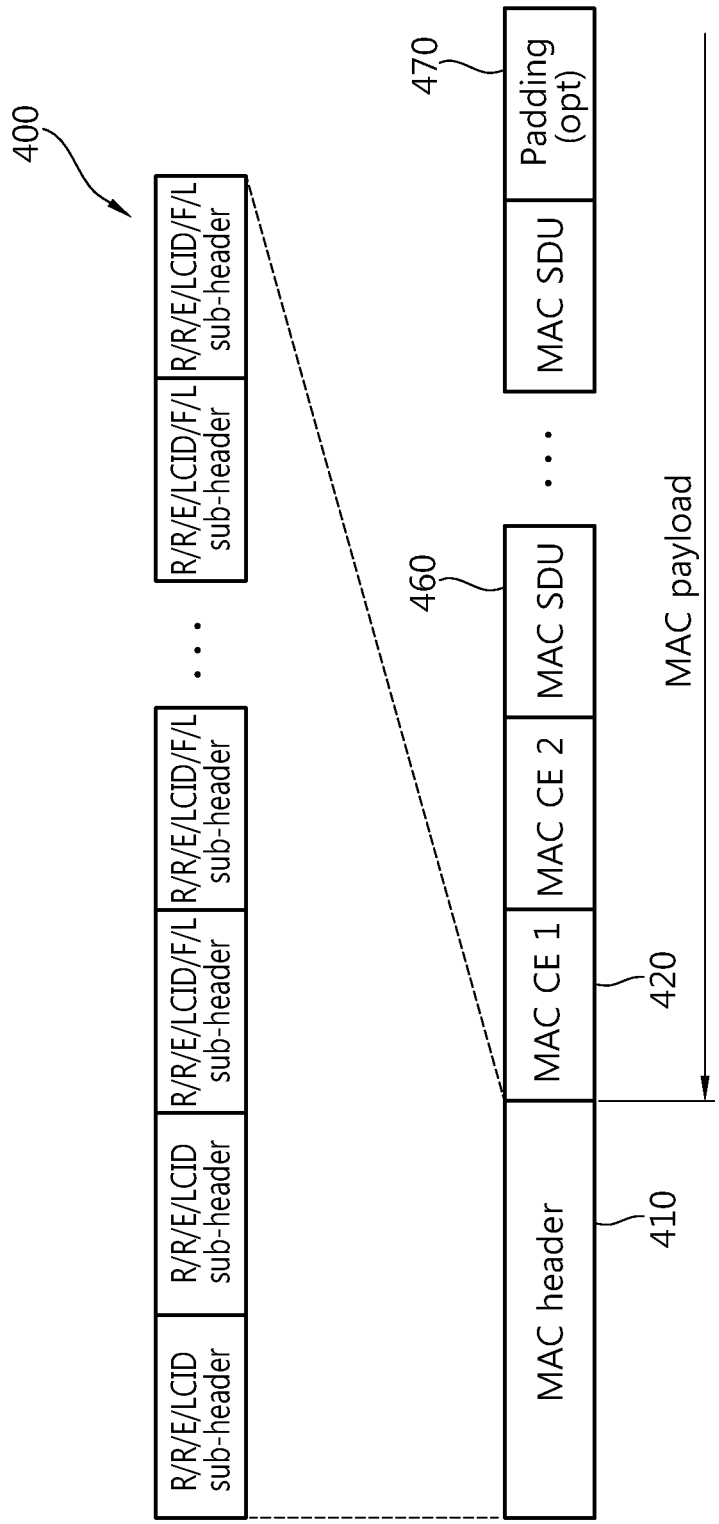
FIG. 4 shows a structure of a MAC PDU in 3GPP LTE.

FIG. 4 shows a structure of a MAC PDU in 3GPP LTE.

A MAC Protocol Data Unit (PDU) 400 includes a MAC header 410, zero or more MAC control elements (CEs) 420, zero or more MAC service data units (SDUs) 460 and optionally padding bits 470. Both the MAC header 410 and the MAC SDUs 460 are of variable sizes. The MAC SDUs 460 is a data block provided from a higher layer (e.g., an RLC layer or an RRC layer) of a MAC layer. The MAC CE 420 is used to deliver control information of the MAC layer such as a BSR.

The MAC PDU header 410 includes one or more subheaders 411. Each subheader corresponds to either a MAC SDU, a MAC CE or padding bits.

The subheader 411 includes six header fields R/R/E/LCID/F/L but for the last subheader in the MAC PDU 400 and for fixed sized MAC CEs. The last subheader in the MAC PDU 410 and subheaders for fixed sized MAC CEs include solely of the four header fields R/R/E/LCID. A subheader corresponding to the padding bits includes four header fields R/R/E/LCID.

Descriptions on each field are as follows.

R (1 bit): A reserved field.

E (1 bit): An extended field. It indicates whether there are F and L fields in a next field.

LCID (5 bit): A logical channel ID field. It indicates a type of the MAC CE or a specific logical channel to which the MAC SDU belongs.

F (1 bit): A format field. It indicates whether a next L field has a size of 7 bits or 15 bits.

L (7 or 15 bit): A length field. It indicates a length of the MAC CE or MAC SDU corresponding to the MAC subheader.

The F and L fields are not included in a MAC sub-header corresponding to a fixed-sized MAC CE.

FIG. 5 shows structures of MAC CEs used for BSR.

A subfigure (A) shows a short MAC CE 422 used for a short BSR and a truncated BSR which include one Logical Channel Group (LCG) ID field and one corresponding Buffer Size field A subfigure (B) shows a long MAC CE 424 used for a long BSR which includes four Buffer Size fields corresponding to LCG IDs #0 through #3.

The BSR formats are identified by MAC PDU subheaders with LCIDs.

A LCG ID field identifies the group of logical channel(s) which buffer status is being reported.

A Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The length of this field is 6 bits. The values taken by the Buffer Size field are shown in Table 1.

TABLE 1

| Index | Buffer Size value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |

TABLE 1-continued

| Index | Buffer Size value [bytes] |
|---|---|
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS < = 150000 |
| 63 | BS > 150000 |

According to Table 1, BSR can report the buffer size that is ranged from 0 to 150 kbytes or more than 150 kbytes.

For regular and periodic BSR, if more than one LCG has data available for transmission in the TTI where the BSR is transmitted, the long BSR is reported. Otherwise, the short BSR is reported.

For padding BSR, if the number of padding bits is equal to or larger than the size of the short BSR plus its subheader but smaller than the size of the long BSR plus its subheader, determine whether more than one LCG has data available for transmission in the TTI where the BSR is transmitted. If more than one LCG has data available for transmission in the TTI where the BSR is transmitted, a truncated BSR of the LCG with the highest priority logical channel with data available for transmission is reported. Or else a short BSR is reported. If the number of padding bits is equal to or larger than the size of the long BSR plus its subheader, the long BSR may be reported.

Now, a multiple carrier system will be described.

The 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 6:
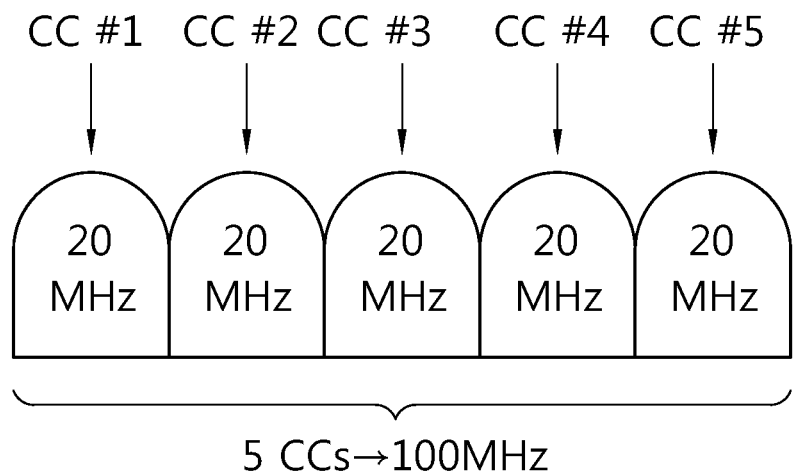
FIG. 6 shows an example of multiple carriers.

FIG. 6 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs is exemplary purposes only. Each CC may have a different bandwidth. The number of downlink CCs and the number of uplink CCs may be identical to or different from each other.

Figure 7:
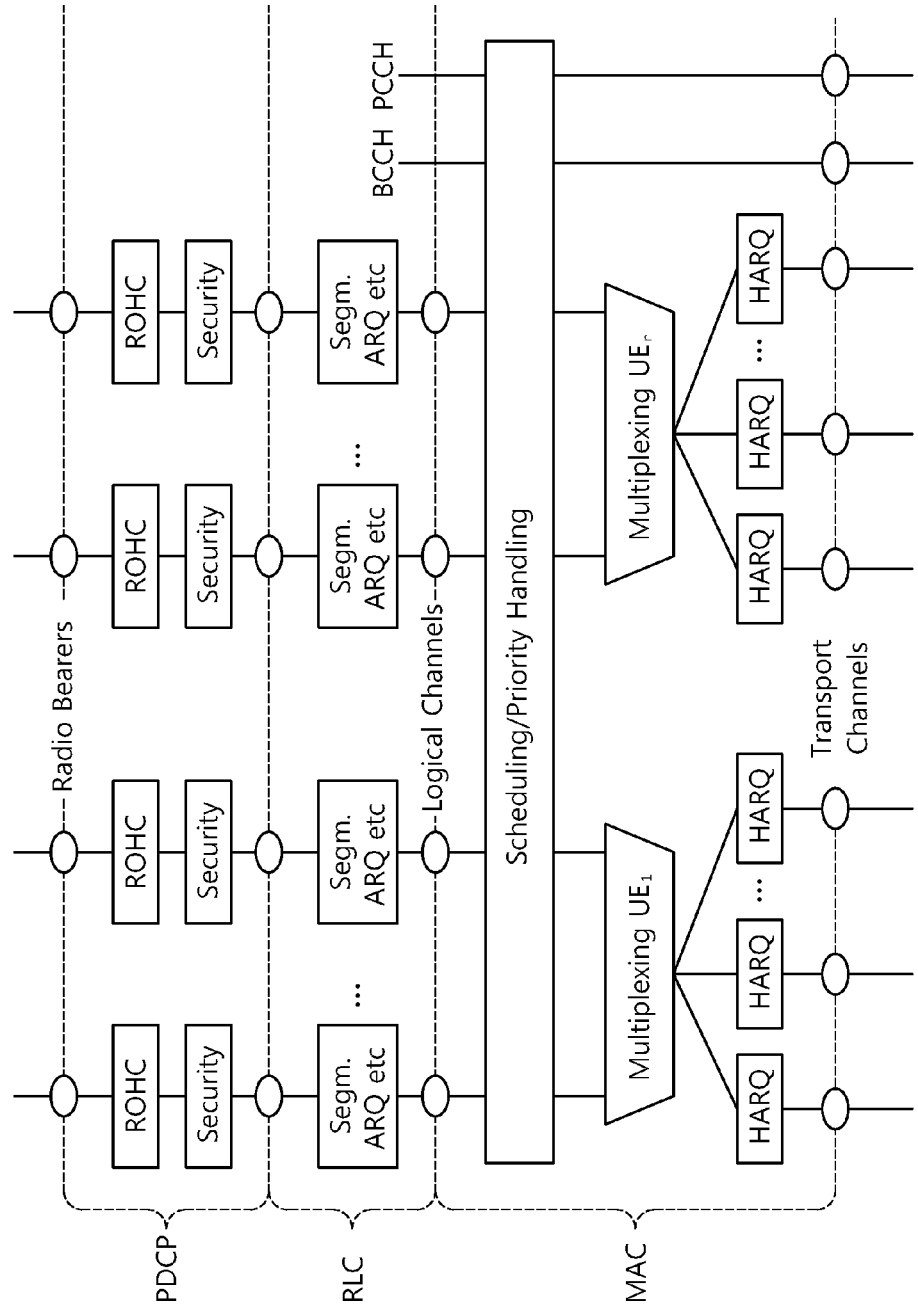
FIG. 7 shows a second-layer structure of a BS for multiple carriers.
Figure 8:
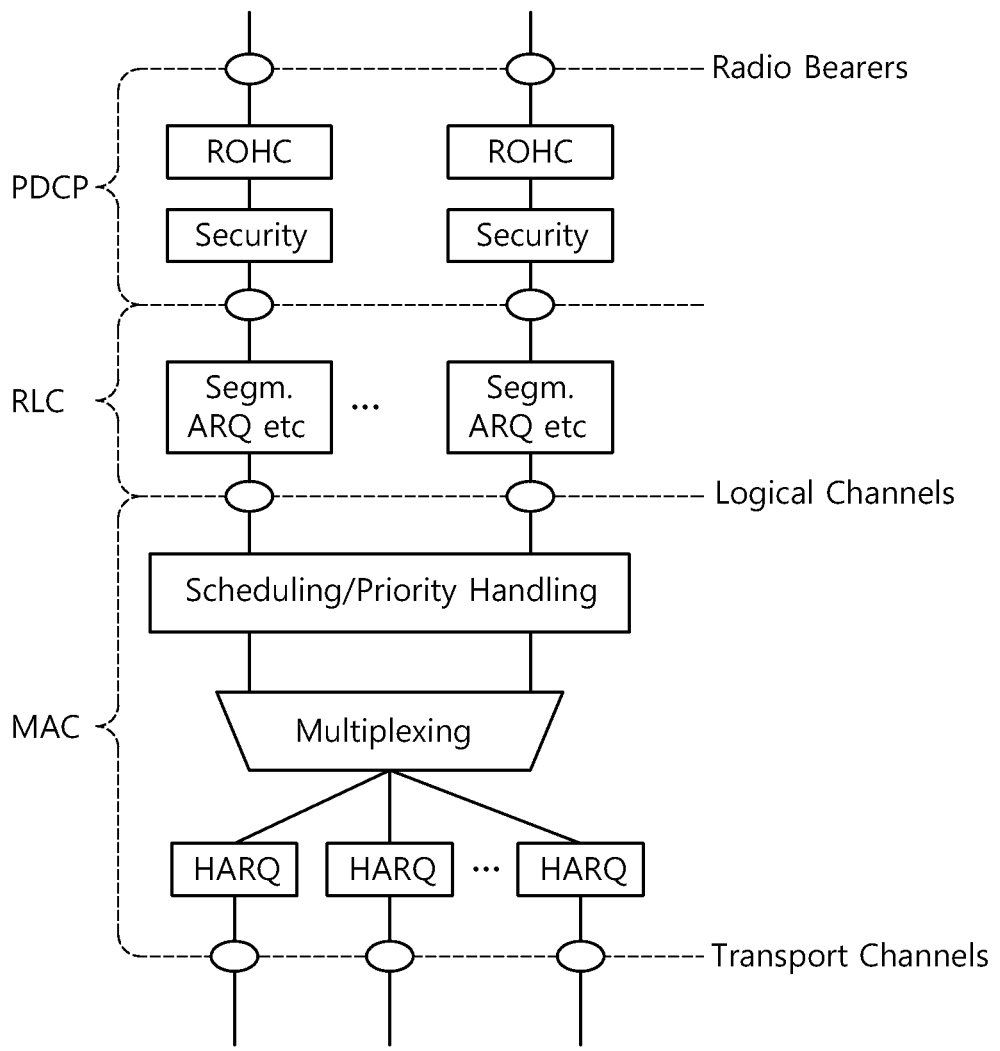
FIG. 8 shows a second-layer structure of a UE for multiple carriers.

FIG. 7 shows a second-layer structure of a BS for multiple carriers. FIG. 8 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block on a transport channel. Therefore, a plurality of HARQ entities can transmit or receive a plurality of transport blocks through a plurality of CCs.

One CC (or a CC pair of a downlink CC and an uplink CC) may correspond to one cell. When a synchronous signal and system information are provided by using each downlink CC, it can be said that each downlink CC corresponds to one serving cell. When the UE receives a service by using a plurality of downlink CCs, it can be said that the UE receives the service from a plurality of serving cells.

The BS can provide the plurality of serving cells to the UE by using the plurality of downlink CCs. Accordingly, the UE and the BS can communicate with each other by using the plurality of serving cells.

The conventional 3GPP LTE defines a maximum buffer size that can be indicated by a BSR to 150 kbytes by considering a 2 round trip time (RTT) and a UL transport block having a size of up to 75376 bits.

However, the buffer size is inevitably increased with the introduction of multiple carriers and UL MIMO. For example, when using 5 UL CCs and 2 UL antenna ports, the maximum buffer size can be 1500 kbytes which is 10 times the previous size.

When the BSR is reported according to the conventional BSR size level of Table 1, the BS cannot distinguish a buffer size in the range of 150 kbytes to 1500 kbytes. Therefore, the BS may not be able to effectively perform scheduling on UL radio resources.

According to a size of a buffer size field, i.e., 6 bits, a new BSR size level that expresses 0 bit to 1500 kbytes can be defined. However, since a value indicating the buffer size is increased in comparison with the buffer size level of Table 2, resolution may be decreased. Therefore, UL radio resources may not be effectively scheduled to UEs that use a small amount of data.

In the proposed invention, in order for the UE to report its buffer size to the BS, if the buffer size of the UE exceeds a specific value (or this may be referred to as a reference value), buffer status information having a first format is used to indicate that the buffer size exceeds the reference value. In addition, the UE transmits buffer status information having a second format to additionally indicate information on the buffer size that exceeds the reference value.

The buffer size of the UE may be a buffer size included in the BSR.

The reference value may be 150 kbytes. The buffer status information having the first format (such information is called a first part) uses the BSR size level of Table 1. If the buffer size is larger than 150 kbytes, the buffer status information having the first format may indicate "111111" of 6 bits.

The buffer status information having the second format (such information is called a second part) may be included in a MAC PDU with respect to an LCG of which a buffer size exceeds 150 kbytes. The BSR includes a short BSR and a long BSR.

If the short BSR is triggered, the first part includes an LCG ID and a MAC CE indicating the buffer size exceeding 150 kbytes. In addition, the second part indicates an excess buffer size of the LCG indicated by the LCG ID.

If the long BSR is triggered, the UE indicates the buffer size by using the second part, only for the LCG having the buffer size exceeding 150 kbytes in the order of LCG IDs 0 to 3.

For example, it is assumed that the LCG ID 0 has a buffer size of 100 kbytes, the LCG ID 1 has a buffer size of 200 kbytes, the LCG ID 2 has a buffer size of 170 kbytes, and the LCG ID 3 has a buffer size of 140 kbytes. Then, if the long BSR is triggered, the UE transmits the second part including the buffer sizes of the LCG ID 1 and the LCG ID 2. An order of the LCG included in the second part may be either an ascending order or a descending order of the LCG ID, or may be identical to the order of the LCG included in the MAC CE.

The buffer size included in the second part can be expressed by 8 bits per LCG.

The second part may indicate a full buffer size of the LCG, or may indicate an excess buffer size with respect to the reference value. For example, if the LCG ID 1 has a buffer size of 200 kbytes, the first part indicates that the buffer size of the LCG ID 1 exceeds 150 kbytes. The second part may indicate that the buffer size of the LCG ID 2 is 200 kbytes, or may indicate 50 kbytes which is an excess size with respect to 150 kbytes.

When a regular BSR or a periodic BSR is triggered, the BSR has a higher priority than a MAC SDU. Therefore, the BSR is located before the MAC SDU in the MAC PDU. The second part may be located next to the MAC SDU. If the BSR indicates the excess size with respect to the reference value, buffer size information having the second format may be located in a last portion of the MAC PDU in which previous padding bits are present.

If a padding BSR or a truncated BSR is triggered, the BSR has a lower priority than the MAC SDU. Therefore, the BSR is located next to the MAC SDU if the BSR can be inserted to the MAC PDU. If the padding BSR or the truncated BSR is included in the MAC PDU, the second part may be located next to the BSR.

Figure 9:
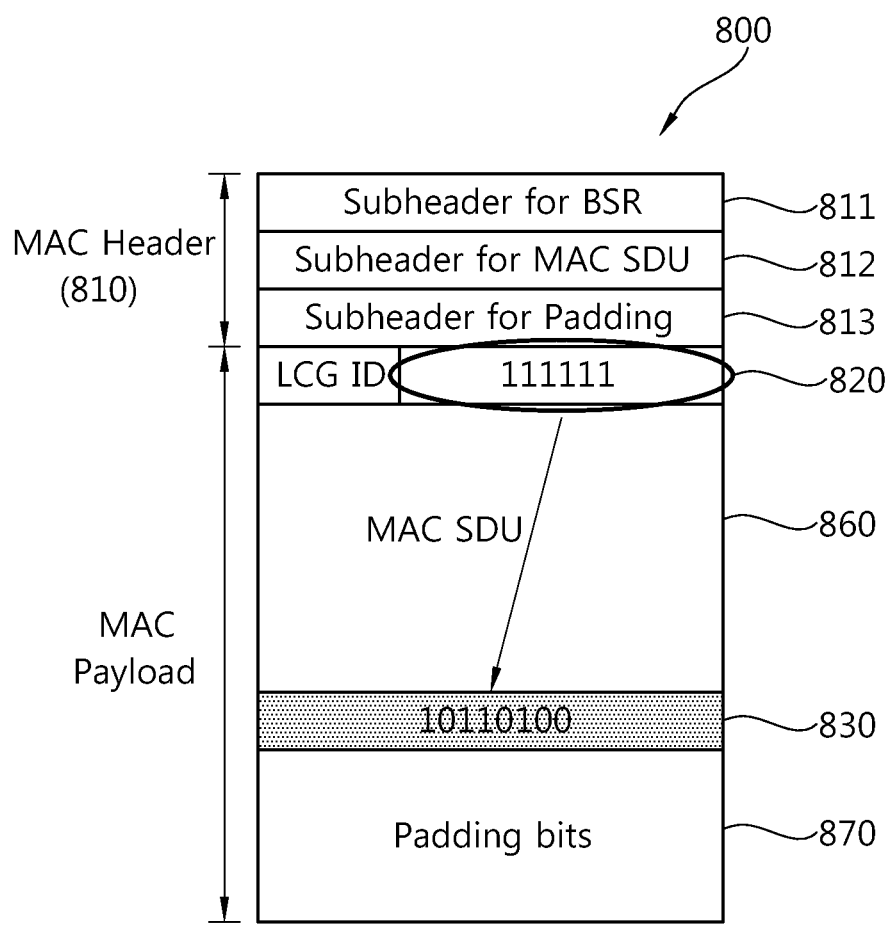
FIG. 9 shows a MAC PDU structure according to an embodiment of the present invention.

FIG. 9 shows a MAC PDU structure according to an embodiment of the present invention. The MAC PDU structure is for a regular BSR.

A MAC PDU 800 includes a MAC header 810 and a MAC payload. The MAC payload includes a MAC CE 820 for a short BSR, a MAC SDU 860, and padding bits 870. The MAC header 810 includes a subheader 811 for the BSR, a subheader 812 for the MAC SDU, and a subheader 813 for padding.

The MAC CE 820 is a first part indicating that a buffer size of an LCG corresponding to an LCG ID is larger than a reference value. A second part 830 is included in the MAC payload.

The first part indicates '111111', and the second part 830 indicates an excess buffer size.

Figure 10:
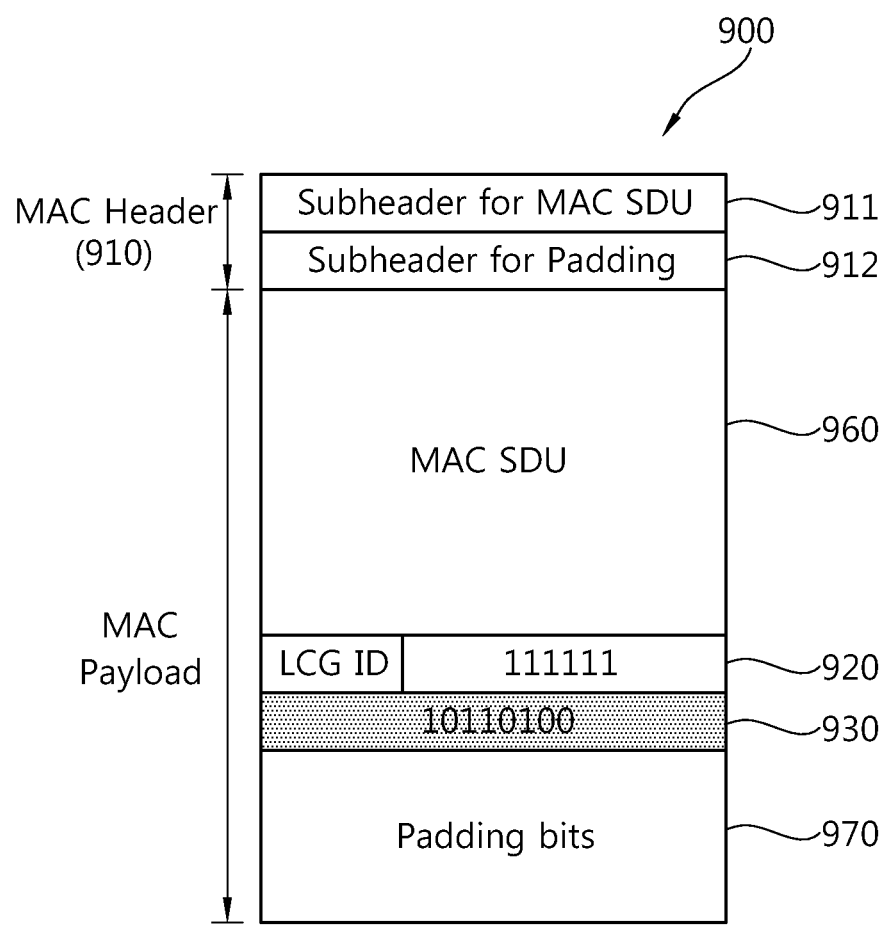
FIG. 10 shows a MAC PDU structure according to another embodiment of the present invention.

FIG. 10 shows a MAC PDU structure according to another embodiment of the present invention. The MAC PDU structure is for a padding BSR.

A MAC PDU 900 includes a MAC header 910 and a MAC payload. The MAC payload includes a short BSR 920, a MAC SDU 960, and padding bits 970. The MAC header 910 includes a subheader 911 for the MAC SDU and a subheader 912 for padding.

Since the padding BSR is used, the short BSR 920 is located next to the MAC SDU 960.

The short BSR 920 is a first part indicating that a buffer size of an LCG corresponding to an LCG ID is larger than a reference value. A second part 930 is contiguous to the first part.

Figure 11:
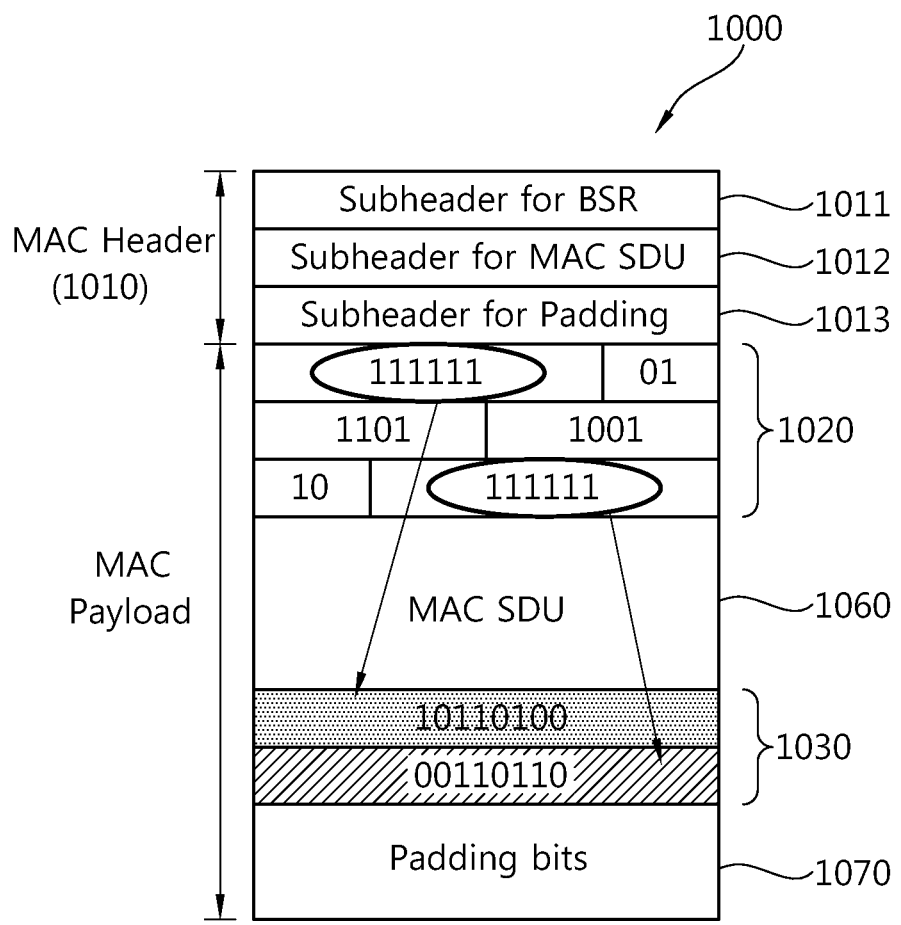
FIG. 11 shows a MAC PDU structure according to another embodiment of the present invention.

FIG. 11 shows a MAC PDU structure according to another embodiment of the present invention. The MAC PDU structure is for a regular BSR.

A MAC PDU 1000 includes a MAC header 1010 and a MAC payload. The MAC payload includes a MAC CE 1020 for a long BSR, a MAC SDU 1060, and padding bits 1070. The MAC header 1010 includes a subheader 1011 for the BSR, a subheader 1012 for the MAC SDU, and a subheader 1013 for padding.

The MAC CE 1020 is a first part indicating that a buffer size of an LCG corresponding to an LCG ID 0 and a buffer size of an LCG corresponding to an LCG ID 3 are larger than a reference value.

A second part 1030 indicates the buffer sizes of the LCG ID 0 and the LCG ID 3.

Figure 12:
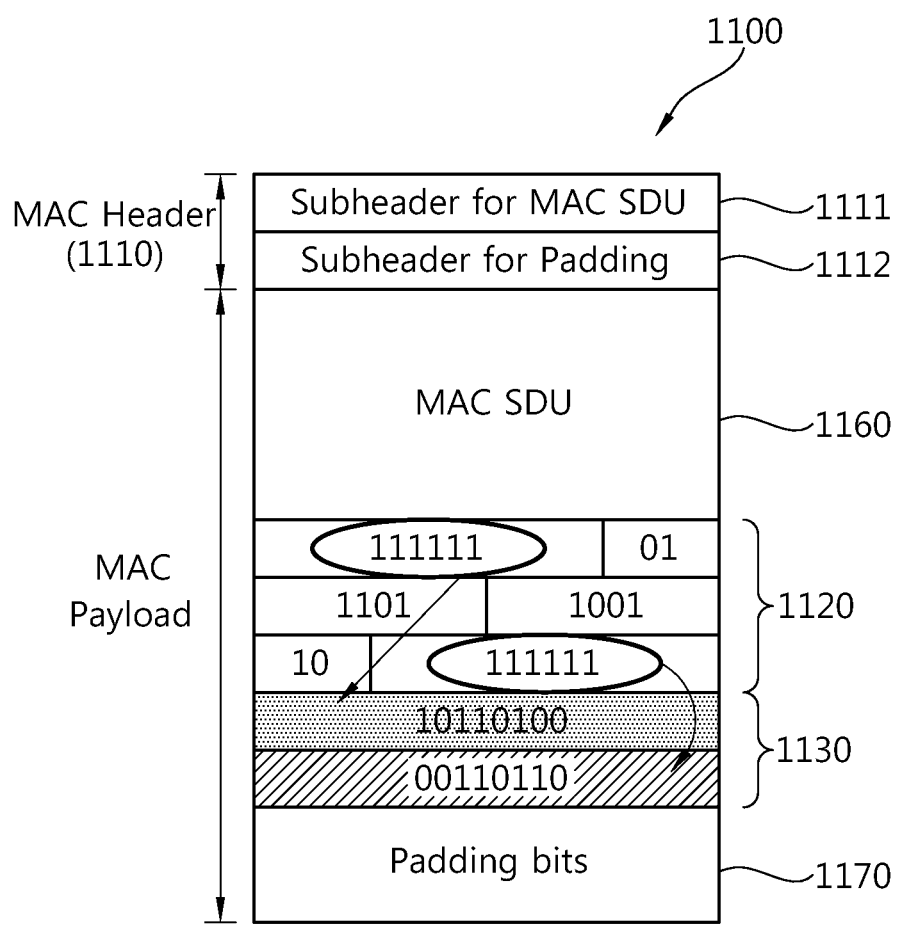
FIG. 12 shows a MAC PDU structure according to another embodiment of the present invention.

FIG. 12 shows a MAC PDU structure according to another embodiment of the present invention. The MAC PDU structure is for a padding BSR.

A MAC PDU 1100 includes a MAC header 1110 and a MAC payload. The MAC payload includes a long BSR 1120, a MAC SDU 1160, and padding bits 1170. The MAC header 1110 includes a subheader 1111 for the MAC SDU and a subheader 1112 for padding.

Since the padding BSR is used, the long BSR 1120 is located next to the MAC SDU 1160.

The long BSR 1120 is a first part indicating that a buffer size of an LCG corresponding to an LCG ID 0 and a buffer size of an LCG corresponding to an LCG ID 3 are larger than a reference value. A second part 1130 indicates the buffer sizes of the LCG ID 0 and the LCG ID 3.

A method of reporting a buffer status when a buffer size exceeds 150 kbytes is provided. A UE can report the buffer size that is increased with the introduction of multiple carriers and UL MIMO. Backward compatibility with the legacy system can be maintained, and a BS can further effectively perform scheduling based on a BSR.

Figure 13:
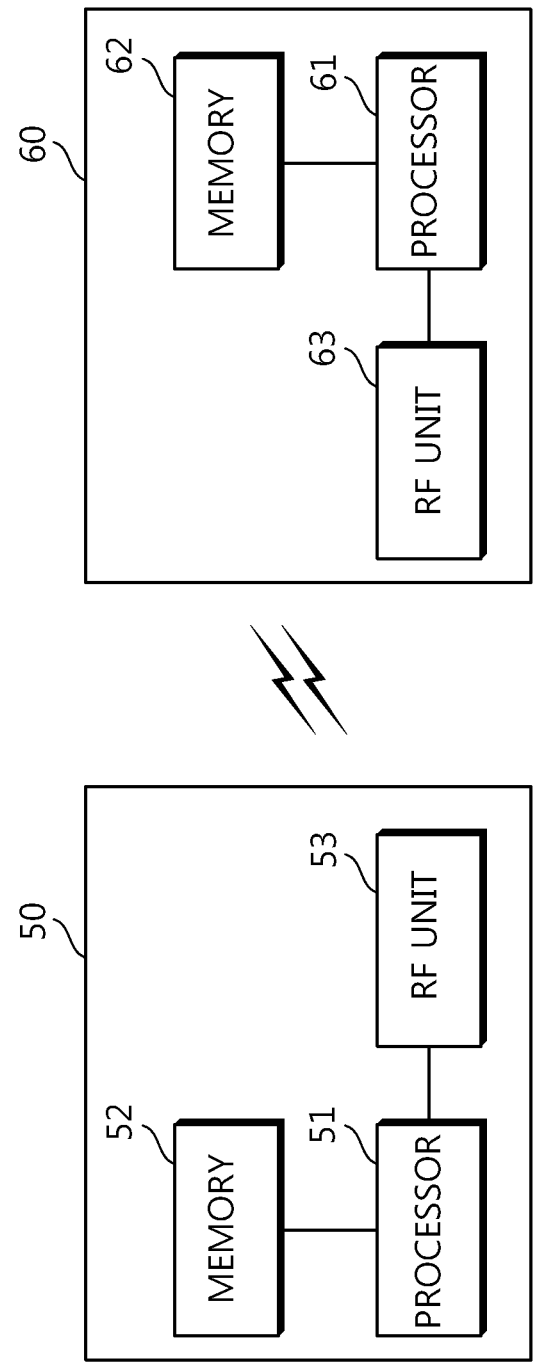
FIG. 13 is a block diagram showing a wireless communication system for implementing an embodiment of the present invention.

FIG. 13 is a block diagram showing a wireless communication system for implementing an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the above embodiments, the operation of the BS 50 can be implemented by the processor 51.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the above embodiments, the operation of the UE 60 can be implemented by the processor 61. The processor 61 can implement the method of reporting an amount of information.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of reporting an amount of information in a wireless communication system, the method comprising:

reporting, by a user equipment, a first part of a buffer status report (BSR) indicating that the amount of information is larger than a specific value, wherein the information is a buffer size of the user equipment included in the BSR and the first part is reported when the buffer size exceeds the specific value; and reporting, by the user equipment, a second part of the BSR indicating the amount of the information, wherein:

the first part and the second part are included in a medium access control (MAC) protocol data unit (PDU);

the BSR includes a short BSR and a long BSR;

the first part and the second part are included in both the short BSR and the long BSR;

the amount of the information indicated by the second part is an excess buffer size with respect to the specific value; and a location of the second part within the MAC PDU is determined by a type of the BSR.

2. The method of claim 1, wherein the MAC PDU includes a MAC header, a MAC control element (CE) and the second part.

3. The method of claim 2, wherein the MAC CE includes the first part and a logical channel group identifier which identifies a group of at least one logical channel for which buffer status is being reported.

4. The method of claim 3, wherein the MAC header includes a subheader corresponding to the MAC CE.

5. The method of claim 1, wherein a length of the first part is 6 bits.

6. The method of claim 1, wherein a value of the first part is '111111'.

7. An apparatus for reporting an amount of information in a wireless communication system, the apparatus comprising:
- a radio frequency unit for receiving and transmitting radio signals;
- a processor operatively coupled with the radio frequency unit and configured for:
- reporting a first part of a buffer status report (BSR) indicating that the amount of information is larger than a specific value, wherein the information is a buffer size of the apparatus included in the BSR and the first part is reported when the buffer size exceeds the specific value; and
- reporting a second part indicating the amount of the information, wherein:
- the first part and the second part are included in a medium access control (MAC) protocol data unit (PDU);
- the BSR includes a short BSR and a long BSR;
- the first part and the second part are included in both the short BSR and the long BSR;
- the amount of the information indicated by the second part is an excess buffer size with respect to the specific value; and
- a location of the second part within the MAC PDU is determined by a type of the BSR.

8. The apparatus of claim 7, wherein the MAC PDU includes a MAC header, a MAC control element (CE) and the second part.

9. The apparatus of claim 8, wherein the MAC CE includes the first part and a logical channel group identifier which identifies a group of at least one logical channel for which buffer status is being reported.

10. The apparatus of claim 9, wherein the MAC header includes a subheader corresponding to the MAC CE.

11. The apparatus of claim 7, wherein a length of the first part is 6 bits.

12. The apparatus of claim 7, wherein a value of the first part is '111111'.

* * * * *